United States Patent [19]

van Ooij

[11] Patent Number: 5,498,481
[45] Date of Patent: Mar. 12, 1996

[54] METAL SUBSTRATE WITH ENHANCED CORROSION RESISTANCE AND IMPROVED PAINT ADHESION

[75] Inventor: Wim J. van Ooij, Fairfield, Ohio

[73] Assignee: Armco Inc., Middletown, Ohio

[21] Appl. No.: 499,585

[22] Filed: Jul. 7, 1995

Related U.S. Application Data

[62] Division of Ser. No. 259,754, Jun. 10, 1994, Pat. No. 5,455,080, and a continuation of Ser. No. 936,197, Aug. 26, 1992, abandoned.

[51] Int. Cl.$^6$ .............................. B05D 1/06; B32B 27/38
[52] U.S. Cl. .................. 428/413; 428/421; 428/425.5; 428/447; 428/448; 428/450; 428/451; 428/480
[58] Field of Search .................... 428/413, 421, 428/425.5, 447, 448, 450, 451, 480

[56] References Cited

U.S. PATENT DOCUMENTS

| | | | |
|---|---|---|---|
| 4,608,421 | 8/1986 | Lin | 525/403 |
| 5,077,354 | 12/1991 | Woo et al. | 528/26 |
| 5,108,793 | 4/1992 | van Ooij | 427/327 |

FOREIGN PATENT DOCUMENTS

| | | |
|---|---|---|
| 230145 | 7/1987 | European Pat. Off. . |
| 379995 | 8/1990 | European Pat. Off. . |
| 58-168666 | 10/1983 | Japan . |
| 62-161865 | 2/1987 | Japan . |
| 63-273669 | 11/1988 | Japan . |
| 63-304566 | 12/1988 | Japan . |
| 1152169 | 6/1989 | Japan . |
| 2138378 | 5/1990 | Japan . |
| 3259937 | 11/1991 | Japan . |

*Primary Examiner*—Michael Lusignan
*Assistant Examiner*—Erma Cameron
*Attorney, Agent, or Firm*—R. J. Bunyard; L. A. Fillnow; R. H. Johnson

[57] ABSTRACT

This invention is a blended powder mixture including a thermosetting resin and a solid, non-hydrolyzed, functional low molecular weight organosilane coupling agent. The powder mixture may be used to form a composite coating to protect a steel substrate from corrosion. The composite coating is formed by coating the substrate with an inorganic layer such as a silicate, depositing the powder mixture over the inorganic layer, heating the substrate to a temperature at least equal to the curing temperature of the resin and maintaining the substrate at the curing temperature for sufficient time to crosslink the resin and to diffuse the organosilane to the substrate whereby the crosslinked layer is coupled to the inorganic layer by the organosilane. The powder mixture includes 0.01–10 wt. % organosilane having a melting point no greater than the curing temperature of the resin. Preferred thermosetting resins include epoxy, polyester, epoxy-polyester, acrylic, acrylic-urethane or fluorovinyl.

6 Claims, No Drawings

METAL SUBSTRATE WITH ENHANCED CORROSION RESISTANCE AND IMPROVED PAINT ADHESION

This application is a division of U.S. Ser. No. 08/259,754; filed Jun. 10, 1994; now U.S. Pat. No. 5,455,080 and a continuation of U.S. Ser. No. 07/936,197; filed Aug. 26, 1992, now abandoned; both applications incorporated herein by reference.

BACKGROUND OF THE INVENTION

This invention relates to an organic powder composition and a method of using the powder composition for forming a crosslinked paint coupled to a metal substrate for protecting the substrate from corrosion. More particularly, the powder composition includes a homogeneous mixture of a thermosetting resin and a solid, non-hydrolyzed, functional organosilane coupling agent.

It is known to form a composite coating on steel sheet for providing corrosion protection. U.S. Pat. No. 5,108,793; incorporated herein by reference, discloses rinsing a steel sheet with an alkaline solution containing a silicate, drying the sheet to form an insoluble inorganic silicate coating, rinsing the coated sheet in an aqueous solution containing an organosilane coupling agent and then drying the sheet forming a silane film on the outer surface of the silicate coating. The silicate coating provides excellent corrosion protection of the steel sheet. If the sheet is painted, the silane film acts as a coupling agent forming a strong covalent bond between the silicate coating and the paint. An embodiment of this patent includes cold-rolled and galvanized steel sheets initially treated with a phosphate conversion coating, then treated with the two step silicate/silane rinse coating and lastly electrostatically coated with a powder paint or cathodically electrocoated with a paint for forming a composite coating. The silicate/silane layer improves corrosion protection and strengthens the bond between the inner phosphate layer and the outer paint layer. A disadvantage with this process is that some of the silicate inevitably becomes transferred to the silane rinse tank thereby contaminating the silane solution. This contamination may reduce the effectiveness of the silane as a coupling agent. Another disadvantage is that hydrolyzed silane solutions have a relatively short storage life. Organosilanol solutions tend to condense and polymerize thereby minimizing their chemical interaction with paints.

It is well known to provide corrosion protection to steel sheet by coating with a liquid resin containing an organosilane coupling agent. These liquid resins have the same disadvantage referred to above in that hydrolyzed silanes have reduced effectiveness as coupling agents.

More recently, it has become known to provide corrosion protection to steel sheet by coating the sheet with a powder containing a silicone resin. U.S. Pat. No. 5,077,354 discloses an in-situ formed polymeric mixture comprising an acrylic graft copolymer of silicone resin used as a polymeric binder in powder paint. Silicone resin and ethylenic monomers are dissolved in a solvent heated to 50°–150° C. and mixed until polymerization is completed. The solvent then is stripped away leaving a non-gelled polymerized binder. A disadvantage of using this powder paint is believed to be that a good bond is not formed between the paint and steel substrate. Since the silicone resin has already been reacted when in-situ combined with the ethylenic monomers when forming the acrylic polymer, the silicone resin will not act as a coupling agent between the outer acrylic layer and the steel substrate.

Accordingly, there is a need to provide an organosilane having a long storage life that can be used as a coupling agent when forming a crosslinked coating. There is a further need for developing a low cost, environmentally safe process for forming an adherent crosslinked coating coupled to a metal substrate such as cold-rolled steel or galvanized steel.

BRIEF SUMMARY OF THE INVENTION

The invention relates to an organic powder composition and a method of using the powder composition for forming a crosslinked paint coupled to a metal substrate for protecting the substrate from corrosion. The powder composition of the invention includes a homogeneous mixture of a thermosetting resin and a solid, non-hydrolyzed, functional low molecular weight organosilane coupling agent. The organosilane is a solid at ambient temperature, has a melting point no greater than the curing temperature of the resin and is readily dissolved into the resin during crosslinking on the substrate.

Another feature of the invention includes forming a corrosion resistant coating on a metal substrate using the aforesaid powder mixture with the coating being coupled to the substrate by the organosilane. The coating is the reaction product formed by in-situ curing of the powder mixture after being deposited onto the substrate. Preferably, the crosslinked layer has a thickness of at least 10 μm.

Another feature of the invention is for the aforesaid corrosion resistant coating to be a composite coating including a non-toxic inorganic inner layer coupled to the outer crosslinked layer by the organosilane.

A further feature of the invention is forming a corrosion resistant coating on a metal substrate including the steps of providing a homogeneous powder mixture of a thermosetting resin and a solid, non-hydrolyzed, functional low molecular weight organosilane coupling agent, depositing a layer of the powder mixture onto the substrate, heating the substrate to a temperature at least equal to the curing temperature of the resin and maintaining this temperature for sufficient time to melt the resin and the organosilane. The resin is cured and forms a crosslinked layer that becomes tightly bonded to the substrate by the organosilane.

Another feature of the invention is for the aforesaid powder mixture to have an organosilane concentration of 0.01–10 wt. %.

Another feature of the invention includes the additional step of depositing an inorganic layer onto the substrate prior to depositing the powder layer.

Another feature of the invention is for the aforesaid crosslinked layer to have a thickness of at least 10 μm.

Another feature of the invention is for the aforesaid resin to have a curing temperature of 100°–250° C.

Another feature of the invention is for the aforesaid inorganic layer to include a silicate.

Another feature of the invention is for the aforesaid resin being from the group consisting of epoxy, polyester, epoxy-polyester, acrylic, acrylic-urethane or fluorovinyl.

An object of the invention is to form a corrosion resistant adherent coating on a metal substrate using an organosilane coupling agent having a long storage life.

Another object is to form a corrosion resistant adherent composite coating on a metal substrate having an inorganic inner layer formed from a rinse solution having an extended storage life.

Another object is to provide a low cost, environmentally safe, process for forming a corrosion resistant adherent coating on cold-rolled or galvanized steel sheets using an organosilane coupling agent.

Advantages of the invention include a long storage life for an organosilane coupling agent, forming a corrosion resistant coating having good adherence to a variety of metal surfaces without using an environmentally hazardous waste substance, e.g. chromate rinses, and no contamination of a rinse solution containing an inorganic coating material.

DETAILED DESCRIPTION OF THE PREFERRED EMBODIMENTS

The invention includes providing a homogeneously blended powder composition, i.e., a paint, including a thermosetting resin and a solid, non-hydrolyzed, functional low molecular weight organosilane coupling agent that is soluble in the thermosetting resin. The organic resin may be any thermosetting polymer such as epoxy, polyester, epoxy-polyester, acrylic, acrylic-urethane or fluorovinyl. The silane may be any organic compound so long it is solid at ambient temperature, has a melting temperature no higher than the curing temperature of the resin, capable of being dissolved into the resin and does not include OH groups. By a low molecular weight silane is meant monomeric, dimeric or oligomeric molecules, i.e., $RSi(OX)_3$.

Hydrolyzed organosilanes, such as $NH_2-(CH_2)_3Si(OH)_3$, are undesirable because they are liquid at ambient temperature and tend to polymerize quickly. Although solid, non-hydrolyzed organosilanes react more slowly than hydrolyzed organosilanes, the non-hydrolyzed forms do not polymerize as rapidly. For epoxy, polyester and acrylic resins, the following commercially available alkoxy silanes and chlorosilanes could be used: phenylallyldichlorosilane, neophylmethyldiethoxysilane (or the dimethoxy version), n-octadecyldimethylmethoxysilane, n-octadecyldimethyl[3-trimethoxysilyl-propyl] ammoniumchloride, 2-(3,4-epoxy-clyclohexyl)ethyltrimethoxysilane, t-butyldiphenylmethoxysilane, and styrylethyltrimethoxysilane. For fluorovinyl resins such as PVDF or PTFE, the following commercially available silanes could be used: [2-(perfluorohexyl)ethyl] trichlorosilane, [2-(perfluorooctyl)ethyl]trichlorosilane, 1 H, 1 H, 2H, 2H -perfluoralkyltriethoxysilane, 3,3,3-trifluoro-propyltriethoxysilane or (heptafluoroisopropoxy)propyitriethoxysilane. A preferred silane is 3-(N-styrylmethyl-2-aminoethylamino )-propyltrimethoxysilanehydrochloride having the following structure:

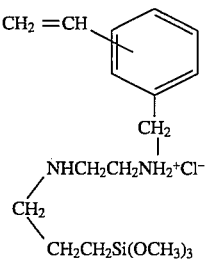

The blended resin/organosilane mixture preferably is used as paint with the mixture including one or more additional powder additives such as a pigment and a filler. For example, one or more of titanium oxide, lead oxide, zinc oxide, silica, calcium oxide, calcium carbonate, chromium oxide, carbon black and mixtures thereof may be used as a pigment. One or more of clay, silica, talc, mica, woolastomite and wood flower may be used as a filler. The powders of the mixture preferably have a particle size less than 325 mesh. The curing temperature of the resin preferably is within the range of about 100°–250° C. The composition of the mixture, including any additives, preferably should be 0.01–10 wt. % organosilane, more preferably at least about 0.2 wt. % organosilane. The concentration of the organosilane should be at least 0.01 wt. % because this amount is needed so that the silane diffuses to the interface of the metal substrate. The concentration of the organosilane should not exceed 10 wt. % because it may adversely affect the paint properties, may cause the paint to become plasticized and may weaken the covalent bond between the paint layer and the metal substrate by weak boundary layer effects.

The blended resin/organosilane mixture will form a very adherent, corrosion resistant, crosslinked coating or paint coupled to a metal substrate by the silane. The coating can be formed on a variety of metal surfaces including, but not limited to, hot rolled and pickled steel sheets, cold-rolled steel sheets, stainless steel sheets, hot dip metallic coated steel sheets, electroplated metallic coated steel sheets, aluminum sheets and aluminum alloy sheets. The metallic coating may include one or more layers of lead, lead alloy, nickel, nickel alloy, nickel terne, zinc, zinc alloy, aluminum, aluminum alloy, and the like. A phosphate conversion coating also may be applied to these steel sheets prior to being coated with the resin/organosilane powder mixture. The metal substrate may include continuous strip and foil, sheets cut to length as well as bars, angles, tubes and beams.

After the resin/organosilane powder mixture is applied to a metal substrate, the substrate is heated to at least the curing temperature of the resin. The resin and organosilane melt with the silane being dissolved into the liquid resin. Prior to the resin being crosslinked and becoming solid, the silane will have interacted with the resin and have migrated to the surface of the substrate. The silane reacts with OH groups on the surface of the substrate forming a strong covalent bond of the type:

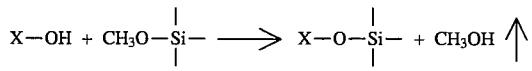

or

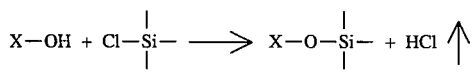

where X is a metal oxide on the surface of the substrate or an inorganic layer. The oxides of some metals include OH groups. In the case where the metal substrate is aluminum, an aluminum alloy or a steel sheet coated with aluminum or an aluminum alloy, the silane may react with the OH groups present in the aluminum oxide surface of the substrate forming a covalent bond of the type Me—O—Si—. In the case where the metal substrate is steel or a steel substrate coated with a metallic coating other than aluminum or an aluminum alloy, the substrate first should be preferably coated with an inner inorganic silicon containing layer having OH groups prior to deposition of the resin/organosilane powder mixture. The inorganic layer may be a silicate or a silica. In the latter case, the silane reacts with the OH groups present in the inorganic silicon containing layer forming a strong covalent bond of the type Si—O—Si— which is preferred to the Me—O—Si— bond described above.

While the silane is reacting with the OH groups on the surface of the metal substrate during curing of the resin, the functional group of the silane also will have interacted with a functional group in the resin or the crosslinker in the resin, e.g.,

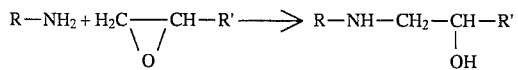

where R may be —(CH$_2$)$_3$Si(OCH$_3$)$_3$ and R' is the thermosetting resin, e.g., epoxy.

In a preferred embodiment, the corrosion resistant coating is a composite of the previously described inner inorganic layer and the outer crosslinked paint layer. Preferably, the inner layer is a silicate formed in a manner as described in U.S. Pat. No. 5,108,793; incorporated herein by reference. Waterglass is dissolved in water, e.g., an alkaline solution containing Ba(NO$_3$)$_3$ addition. The solution preferably is maintained at an elevated temperature, e.g., 55°–60° C., to reduce the rinse time. A steel strip is rinsed with the silicate solution preferably by dipping the strip into the solution for at least 20 seconds. After dipping, the strip is rinsed and dried. The silicate coating provides excellent corrosion protection for the steel strip.

The silicate coated strip then is coated with a layer having a uniform thickness of the blended powder mixture of the thermosetting powder and organosilane powder. The organic powder may be applied to the strip by electrostatic spray guns such as disclosed in U.S. Pat. No. 5,059,446; incorporated herein by reference, or by passing the strip through an electrostatically charged fluidized bed. If the fluidized bed is not electrostatically charged, the strip must be preheated. The strip is heated to at least the curing temperature of the thermosetting resin by first passing the powder coated strip preferably through an induction coil. The heated strip then passes through another heater such as infrared for maintaining the molten resin for sufficient time so that the organosilane becomes dissolved into and diffuses to a surface of the steel strip. An important feature of the invention is that the organosilane be soluble with the thermosetting resin. That is, the organosilane must be capable of being melted as well as go into solution with the molten resin. During this time period, the organosilane also migrates toward the inorganic inner layer, e.g., silicate, thereby establishing a tight covalent bond between the inorganic layer and the crosslinked outer paint layer.

Details of a blended resin/organosilane mixture of the invention will be better understood from the following example. A powder containing a thermosetting resin and optionally one or more fillers or pigments is prepared in a conventional manner. Thereafter, a solid, non-hydrolyzed low molecular weight organosilane is blended with the powder mixture by cryogenic grinding until a homogeneous powder resin/organosilane paint containing at least 0.01 wt. % silane is formed.

A preferred embodiment of a metal substrate coated with an adherent corrosion resistant composite coating of the invention formed from the above described blended resin/organosilane powder mixture now will be described. A steel strip is solvent cleaned of dirt, oil and other surface contaminants. The strip then is rinsed for 20–30 seconds with a solution having a pH of about 12, a temperature of about 55°–60° C. and containing 0.005M of one of waterglass, sodium silicate or sodium metasilicate and 0.005M of one of Ba(NO$_3$)$_2$ or Ca(NO$_3$)$_2$. After being dried, the silica or silicate coated strip then is coated with the above described blended resin/organosilane mixture of the invention such as with electrostatic spray guns or by being passed through a fluidized bed. When being coated using electrostatic guns, the strip preferably is at ambient temperature. When being coated using a fluidized bed, the strip preferably is preheated to an elevated temperature. The powder coated strip then would be heated in a conventional manner such as by induction, infrared and the like, to at least the curing temperature of the thermosetting resin. The strip would be maintained at this temperature for sufficient time to melt the resin and silane, dissolve the silane into the resin and diffuse the silane to the surface of the inorganic silicon coating. The strip now would be coated with an adherent, durable, corrosion resistant composite coating having an outer crosslinked paint layer bonded to an inner inorganic layer by an organosilane. This coated steel would have particular advantages over ordinary painted steels because the interface between the steel and the paint, i.e., the silicon containing inorganic layer, is very resistant to moisture. Thus, the composite coated strip of the invention can advantageously be used in wet environments.

It will be understood various modifications can be made to the invention without departing from the spirit and scope of it. Therefore, the limits of the invention should be determined from the appended claims.

What is claimed is:

1. A metal having a corrosion resistant coating, comprising:

a crosslinked layer coupled to a metal substrate, said crosslinked layer being the reaction product formed by curing a powder, said powder being a blended mixture of a thermosetting resin and a solid, non-hydrolyzed organosilane from the group consisting of monomeric, dimeric or oligomeric molecules, said organosilane including one organofunctional group and one silicon containing group consisting of trialkoxysilyl or trichlorosilane, said organosilane being a solid at ambient temperature and having a melting point no greater than the curing temperature of said resin, said crosslinked layer being coupled to said substrate by said organosilane.

2. The metal of claim 1 wherein the concentration of said organosilane in said mixture is 0.01–10 wt. %.

3. The metal of claim 1 wherein the coating includes a non-toxic, inorganic inner layer, said crosslinked layer being coupled to said inner layer by said organosilane.

4. The metal of claim 3 wherein said inner layer is a silicate.

5. The metal of claim 1 wherein said crosslinked layer has a thickness of at least 10 μm.

6. The metal of claim 1 wherein said resin has a curing temperature of 100°–250° C.

* * * * *